April 19, 1932.    J. I. HULL    1,854,991
SPEED CONTROL
Filed Aug. 28, 1930    2 Sheets-Sheet 1

Inventor:
John I. Hull,
by Charles E. Tullar
His Attorney.

April 19, 1932.   J. I. HULL   1,854,991
SPEED CONTROL
Filed Aug. 28, 1930   2 Sheets-Sheet 2

Inventor:
John I. Hull,
by Charles E. Tullar
His Attorney.

Patented Apr. 19, 1932

1,854,991

UNITED STATES PATENT OFFICE

JOHN I. HULL, OF SCHENECTADY, NEW YORK, ASSIGNOR TO GENERAL ELECTRIC COMPANY, A CORPORATION OF NEW YORK

SPEED CONTROL

Application filed August 28, 1930. Serial No. 478,467.

My invention relates to the speed control of electric motors and its principal object is to provide a method of operating electric motors so as to obtain stable creeping speeds and to provide simple and reliable means for controlling the speed torque characteristics of electric motors so that they will have stable speed characteristics when operated at creeping speeds materially below their normal speeds.

Cloth printing machines, rotary printing machines, and paper machines are usually driven by electric motors having shunt speed characteristics because when compared to a series speed characteristic motor the shunt speed characteristics motor will give a smaller change in speed for a given load change and therefore will give closer speed regulation during the normal operating speed range of these machines. Thus, if these machines are to be normally operated at a constant speed they are usually driven by induction motors or direct current shunt motors, and if they are to be normally operated at variable speeds, they are usually driven by an adjustable speed alternating current brush shifting motor, such as described in Schrage Reissue Patent No. 14,031, Dec. 14, 1915. For matching colors in the cloth printing machines, or for adjusting the rolls, type, etc., of the rotary printing machines, or for similar operations on the paper machines, it is desirable to operate these machines at creeping speeds considerably below the minimum speed of their normal operating speed range. The nature of the operations performed on these machines at the creeping speeds do not ordinarily require any exact creeping speed but they do require a stabilized creeping speed, namely, a creeping speed that is fairly definite so that moderate changes in the torque required to drive the machines do not produce large variations in the creeping speed. Stabilized creeping speeds can not be obtained when the machines are driven by a motor having series characteristics at creeping speeds because a moderate increase in the torque required to drive the machines may stop the motor entirely, whereas a moderate decrease in the torque required to drive the machine may increase the speed considerably above the permissible creeping speed value. Stabilized creeping speeds may be obtained when the machines are driven by a motor having shunt characteristics at the creeping speeds.

When a wound secondary induction motor, or a Schrage motor, is used to drive these machines, it is possible to obtain creeping speeds by inserting resistance in series with the secondary winding of the motor, and if a direct current shunt motor drives the machines it is possible to obtain creeping speeds by inserting resistance in series with the armature. It is desirable to obtain creeping speeds by using resistances in the above described manner because of the simplicity and low initial cost of the resistances, but a serious disadvantage arises because such use of the resistances also cause these normally shunt characteristics motors to have series characteristics, therefore not satisfying the driving requirements at creeping speeds. It is obvious that if a series characteristics motor is used to drive the machines, this motor will also have series characteristics at creeping speeds, thus not satisfying the driving requirements at creeping speeds. This condition led to the frequent use of two motors for driving such machines. In such cases the main motor drives the machines at their normal operating speeds while the creeping speeds are obtained from a small auxiliary shunt characteristics motor driving a gear train connected to the main motor shaft by an over-running clutch so that the main motor can take over the load from the auxiliary motor without a shut down if the process so requires. It is evident that as compared to a single motor drive the use of two motors with gear trains and clutch is more costly, requires more space, and involves mechanical complications liable to get out of order. It is therefore desirable to provide an electric motor which will have shunt characteristics when its speed is reduced by the use of resistance in the manner described.

This desirable result is produced by my invention which consists of an electric motor having stationary and rotatable members provided with windings so arranged that for normal operating speeds I energize the windings to produce the normal magnetic flux of the motor, thereby producing substantially only a motor torque in the rotatable member, and for creeping speeds I insert resistances in the manner described and simultaneously modify the normal magnetic flux of the motor so as to simultaneously produce motor and generator torques in the rotatable member of the motor. The difference between the motor and generator torques will be the effective torque of the motor and the motor will have creeping speeds with shunt characteristics.

My invention will be best understood from the following description when considered in connection with the accompanying drawings while the features of my invention which are believed to be novel and patentable are pointed out in the appended claims.

Fig. 4 represents a preferred embodiment of my invention as applied to a wound secondary induction motor. In this figure I represent the motor primary winding connected to its usual source of alternating current, and in addition I represent a source of direct current and a low frequency alternating current generator, either of which may energize the primary winding or a separate exciting winding so as to simultaneously produce motor and generator torques in the rotatable member of the motor.

Figures 1, 2, 3:
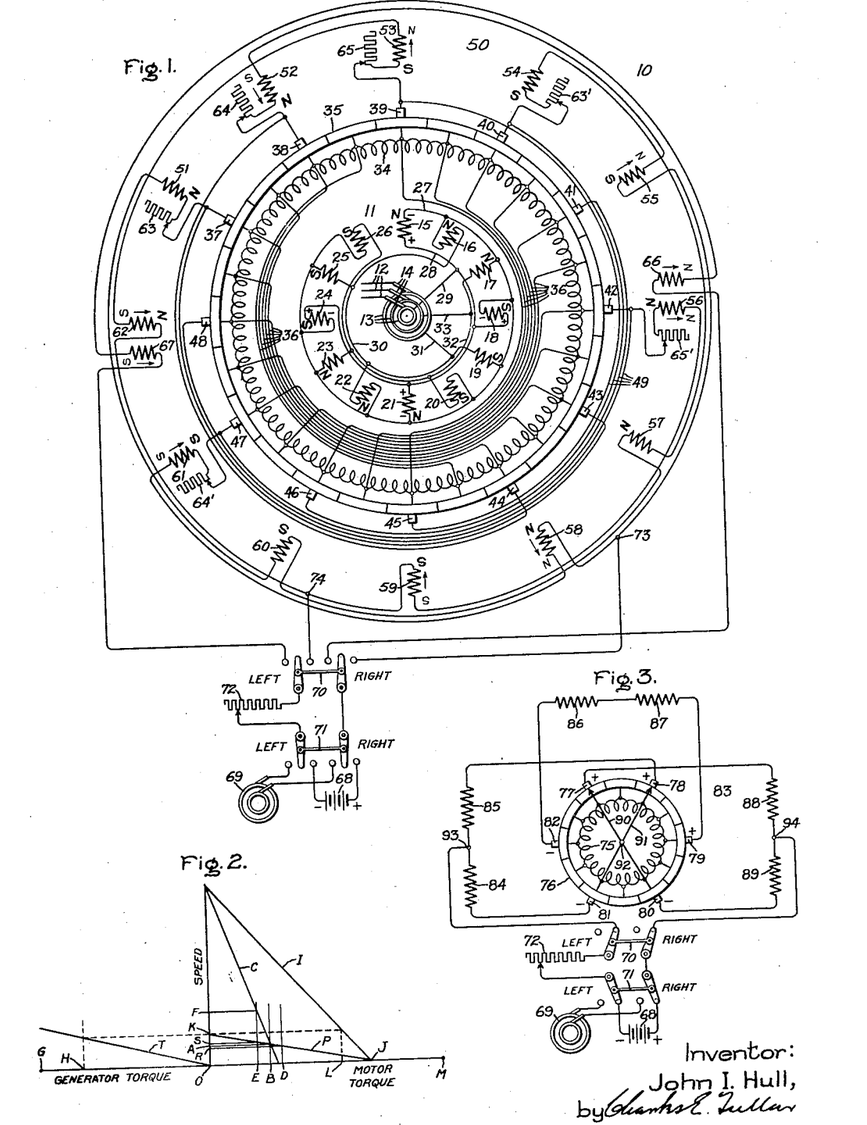
Fig. 1 represents a preferred embodiment of my invention as applied to an adjustable speed alternating current brush shifting motor as for example the Schrage motor. In this figure I represent the motor primary winding connected to its usual source of alternating current, and in addition I represent a source of direct current and a low frequency alternating current generator, either of which may energize the secondary winding or a separate exciting winding so as to simultaneously produce motor and generator torques in the rotatable member of the motor.
Fig. 2 represents speed torque curves which are useful in explaining the results obtained by my invention.
Fig. 3 represents a simplified drawing of the connections between the commutated and secondary winding of a two-poled Schrage motor and a source of direct current or a low frequency alternating current generator when applying my invention to a two-poled Schrage motor. The purpose of Fig. 3 is to assist in the explanation of how the direct current source or the low frequency alternating current generator may be connected to the secondary windings of a Schrage motor with any number of poles so as to circulate direct or low frequency alternating current through the secondary windings simultaneously with the flow of the normal currents through the secondary windings and prevent such normal currents from flowing through the direct current source or through the low frequency alternating current generator.

In Fig. 1, 10 represents an adjustable speed alternating current brush shifting, four-pole, three-phase motor as for example a Schrage motor. The motor 10 usually has a rotating primary winding 11 connected to the alternating current lines 12 by collector rings 13 and brushes 14. The primary winding consists of the coils 15 to 26 inclusive, these coils being spaced 60 electrical degrees apart. The coils 15, 18, 21 and 24 each have one end connected to the lead 27 and the other end connected to a ring 13 by leads 28 and 29, these coils being connected to form alternate magnetic poles. The coils 16, 19, 22 and 25 each have one end connected to the lead 27 and the other end connected to another ring 13 by leads 30 and 31, these coils being connected to form alternate magnetic poles. The coils 17, 20, 23 and 26 each have one end connected to the lead 27 and the other end connected to the remaining ring 13 by leads 32 and 33, these coils being connected to form alternate magnetic poles. The primary winding 11 is thus connected as a three-phase, four-circuit Y winding with the lead 27 forming the Y connection. When the winding 11 is energized by current from the lines 12, there is formed a four-pole rotating magnetic flux whose magnetic polarity at a certain instant is for example represented by the heavy letters N and S adjacent to the coils 15 to 26 inclusive. The motor 10 also has a four-pole rotating commutated winding 34 of the usual direct current, multiple circuit, drum wound type, this winding being connected to the rotating commutator 35. Each of the equalizing leads represented by 36 is connected to diametrically opposite points in the winding 34. On the commutator 35 there rests stationary brushes 37 to 48 inclusive, these brushes being spaced 60 electrical degrees apart and the brushes diametrically opposite each other are connected by one of the leads 49. The motor 10 also has a three-phase, four-pole stationary secondary winding 50 consisting of coils 51 to 62 inclusive, these coils being spaced 60 electrical degrees apart. The coils 51, 60, 57 and 54 form one phase group and are connected in series to form alternate magnetic poles, the ends of this series circuit being connected to the brushes 37 and 40 through the adjustable resistances 63 and 63'. The coils 52, 55, 58 and 61 form a second phase group and are connected in series to form alternate magnetic poles, the ends of this series circuit being connected to the brushes 38 and 47 through the adjustable resistances 64 and 64'. The coils 53, 62, 59 and 56 form a third phase group and are connected in series to form alternate magnetic poles, the ends of this series circuit being connected to the brushes 39 and 42 through the adjustable resistances 65 and 65'. The stationary member of the motor 10 may also be provided with two diametrically opposite exciting coils 66 and 67 connected in series to form opposite magnetic polarities when current flows through them. To simplify the drawings the coils of the primary and secondary windings 11 and 50 and the coils 66 and 67 are represented as concentrated windings instead of the usually distributed windings, and the magnetic polarities of these coils are assumed to be the polarities indicated adjacent to the air gap between the rotating and stationary members of the motor 10. To further simplify the drawings the windings 11 and 34 are represented as smaller than the commutator 35.

The rotating magnetic field of the primary winding 11 induces voltages in the coils of the secondary winding 50 and each series connected group of these coils has its induced voltage in series with the voltage at the brushes to which the group is connected. The currents flowing in the secondary winding 50 produces a four-pole rotating magnetic flux whose polarity at a certain instant is represented by the heavy letters N and S. The reaction between the rotating fluxes of the primary and secondary windings 11 and 50 produces rotation of the motor 10. A direct current source is represented by the battery 68 and a low frequency alternating current generator is represented by 69. Either 68 or 69 may be connected to the switch 70 through the switch 71 and the adjustable resistance 72. The switch 70 has two of its stationary contacts connected to two phase groups of the secondary winding 50 at the points 73 and 74.

The speed of the motor 10 may be varied above and below synchronous speed by shifting the brushes 37 to 48 inclusive. In Fig. 1 the brushes connected to the ends of each secondary phase are represented as separated 180 electrical degrees and it is assumed that the voltage from the winding 34 opposes the voltage induced in the secondary windings, therefore resulting in the minimum speed below synchronism obtainable by brush shifting. The variation in speed during the normal operating speed range of the cloth printing machines, printing presses, paper machines, etc., is obtained by shifting the brushes 37 to 48 inclusive, thus obtaining stable speed regulation of these machines during their normal operating range because the motor 10 has shunt speed characteristics when its speed is varied by shifting the brushes. If desired, the motor 10 can be built so that its speed may be sufficiently reduced by shifting its brushes to operate the machines at their creeping speeds, but as the creeping speeds are usually much lower than the minimum operating speed it will result in the motor 10 being larger than necessary to operate the machines during their normal speed range, thus increasing the cost of the motor and lowering its efficiency and power factor. It is therefore desirable to build the motor 10 so that the normal speed range of the machines is obtained by shifting the brushes and the creeping speed is obtained by setting the brushes at the minimum speed position and further reducing the speed by inserting resistances in series with the secondary winding 50. Thus, if OM and OG in Fig. 2 respectively represent motor and generator torques, and if the creeping speed desired is represented by A and a torque represented by B is required to rotate the machines at the speed A, then the resistances 63 to 65' inclusive, Fig. 1, are adjusted to give a speed torque curve represented by C as this gives the speed A at the torque B. Moderate changes in the torque required to drive the machines at the creeping speed A occur due to variation in the condition of the machines and the material they handle, and it is essential that there shall be only slight speed variations with moderate changes in the torque. When the motor operates with the speed torque curve C and the torque required to drive the machines increases from B to D the motor 10 is unable to rotate the machines and they come to standstill, and if the torque required to drive the machines decreases from B to E the speed will increase from A to F and the machines will run considerably above the permissible creeping speed. This unstable operation at creeping speeds is due to the use of the resistances 63 to 65' inclusive because the speed is now dependent on the resistances used and the load on the motor for a given value of resistances used. It is therefore desirable to use these resistances to obtain creeping speeds and at the same time provide additional means for producing stable operation at the creeping speeds. I will now describe how this result is accomplished.

During the normal operation of the motor 10, the flow of current from the source 12, Fig. 1, produces groups of adjacent N poles and groups of adjacent S poles in the winding 11, these groups combining into single N and S poles, and there is also produced groups of adjacent N poles and groups of adjacent S poles in the winding 50 as shown by the heavy letters N and S, these groups also combining into single N and S poles. Every group of adjacent N and S poles in the windings 11 and 50 carries currents from all three phases and, therefore the normal magnetic flux of the motor 10 will have four poles, each having substantially equal values of the normal magnetic flux. The winding 34 has been described as a multiple circuit winding and it is obvious that the current from each phase of the secondary winding 50 will flow through four parallel paths in the winding 34; thus, for example, the current from the phase connected to the brushes 37 and 40 will flow through four parallel paths in the winding 34 and the same will be true of the other two secondary phases. Each of the paths is inductively related to substantially equal portions of the normal magnetic flux of the motor and the counter voltages induced in these paths will be substantially equal and opposed to each other, therefore resulting in only the normally slight flow of local currents between these paths. The purpose of the equalizing leads 36 is to carry these local currents between these parallel paths so as not to overload the commutator brushes, and it is obvious that if the leads 36 were not provided there would still be four parallel paths in the winding 34 for the current from every secondary phase and these paths would be inductively related to substantially equal portions of the normal magnetic flux of the motor and the commutator brushes would carry the normally slight flow of local currents between the parallel paths. The flow of local currents between the parallel paths of the winding 34 produces a generator torque in the winding 34, and since these currents are normally negligible it is therefore obvious that during normal operation of the motor 10 there will be substantially no generator torque produced in the winding 34.

I will first describe how I produce a substantial generator torque in the winding 34 by circulating current from the direct current source 68 through two phases of the secondary winding 50. Closing the switches 70 and 71 to the right connects the battery 68 to the points 73 and 74 and direct current flows through a portion of the winding 50 in two paths. Assuming the polarity of 68 as shown, one path is from point 73 through coils 55 and 52, brushes 38 and 44, winding 34, brushes 39 and 45, coils 53 and 62, and back to point 74. The other path is from point 73 through coils 58 and 61 brushes 47 and 41, winding 34, brushes 42 and 48, coils 56 and 59, and back to point 74. The direction of the flow of direct current through those coils are shown by the arrows adjacent to those coils and it is seen that there is one set of four consecutive arrows pointing in one direction and another set of four consecutive arrows pointing in the opposite direction. These two sets of arrows result in direct current poles of opposite polarity at those coils as shown for example by the light letters N and S adjacent to those arrows. The direct current poles will be of substantially equal strengths as the number of turns in the coils are substantially equal. There are thus produced four consecutive direct current N poles which combine into one resultant N pole and there are produced four consecutive direct current S poles which combine into one resultant S pole. I have previously described the four-pole winding 34 as having four parallel paths in which the induced voltages are substantially equal and opposite when 34 rotates in a four-pole magnetic flux with each pole having substantially equal portions of the normal flux. It should therefore be obvious that the rotation of winding 34 in the two-pole direct current magnetic flux will generate voltages in the parallel paths with the voltages of two paths additively related to the voltage of the other two paths, thus resulting in an abnormal flow of local currents between these paths and producing a substantial generator torque in the winding 34. Another way of explaining the production of generator torque in the winding 34 is as follows: The direct current magnetic flux is superimposed on the normal magnetic flux and the actual flux of the motor is the resultant of the two fluxes. The direct current flux weakens two of the normal poles and strengthens the other two normal poles; thus at the instant shown in Fig. 1 the direct current flux will weaken the resultant normal N pole of the coils 62, 51 and 52 and the resultant normal S pole of the coils 53, 54 and 55, and will strengthen the resultant normal N pole of the coils 56, 57 and 58, and the resultant normal S pole of the coils 59, 60 and 61. The motor 10 now has a four-pole magnetic flux, but the relative values of the fluxes at the poles have been changed from substantially equal values to substantially unequal values. The parallel paths of the winding 34 will now be inductively related to substantially unequal portions of the motor flux, thus resulting in an abnormal flow of local currents between those paths and producing a substantial generator torque in the winding 34.

I will now explain how generator torque is also produced in the winding 11. Each phase of the winding 11 has four parallel paths and during normal operation of the motor 10 each path is inductively related to substantially equal portions of the normal magnetic flux and the counter voltages in the parallel paths of each phase are substantially equal and opposite and there will be only the normally slight flow of local currents between the paths and substantially no generator torque in the winding 11. Thus, one of the phases consists of the coils 15, 18, 21, and 24 connected in parallel with each other and during normal operation each of those coils is inductively related to substantially equal portions of the normal flux. If at the instant shown in Fig. 1 is is assumed that there is induced in the coil 15 a counter voltage of 100 volts with the polarities as shown adjacent to the coil 15, then the coils 18, 21 and 24 will have induced counter voltages of substantially 100 volts with the polarities as shown adjacent to those coils and there will be substantially no flow of local currents between those coils. In a similar manner it can be shown that there is substantially no flow of local currents between the parallel paths of the other phases of the winding 11. It should be obvious that the rotation of the winding 11 in the two-pole direct current magnetic flux will generate voltages in the coils 15, 18, 21 and 24 and at the instant assumed the voltage polarity of two of these coils will be reversed from that shown and, therefore, the voltages of two coils will be additively related to the voltages of the other two coils, thus resulting in an abnormal flow of local currents between these coils. In a similar manner it can be shown that there will be an abnormal flow of local currents between the coils of the other phases, thereby producing a substantial generator torque in the winding 11. Another way of explaining the production of generator torque in the winding 11 is as follows: As previously described, the direct current flux is superimposed on the normal magnetic flux and results in the motor having substantially unequal values of flux at its poles. The induced counter voltages in the coils 15, 18, 21 and 24 will be substantially unequal and there will be an abnormal flow of local currents between those coils and the same will be true of the coils in the other phases, thus resulting in a substantial generator torque in the winding 11.

The strength of the local circulating currents between the parallel paths of the windings 11 and 34 will depend on the speed and the adjustment of the resistance 72. These currents are zero at zero speed of 10 and increase with increasing speed of 10 for a given setting of 72. Assume that the resistance 72 is adjusted so that the local circulating currents in windings 11 and 34 result in a generator speed torque curve represented by T in Fig. 2 and it requires the torque B to run the machine at the desired speed A. The resistances 63 to 65' inclusive, Fig. 1, will be adjusted so that if there was no generator torque the motor 10 would have a speed torque curve represented by I in Fig. 2. As the generator torque opposes the motor torque the difference between the two torques will be the effective torque of the motor 10. At zero speed represented by O there is no generator torque and the motor 10 has a motor torque OJ, whereas at the speed K the generator torque OH equals the motor torque OL, and the motor 10 has zero torque. The resulting speed torque of the motor 10 is now represented by P and at the torque B the motor has the speed A, and if the torque is increased to D the speed is decreased to R, whereas if the torque is decreased to E the speed is increased to S. The speed variation from R to S is much less than from O to F and the motor 10 has shunt speed characteristics at the creeping speeds and stable operation of the machine at creeping speeds is obtained.

When the number of turns of the windings 50, Fig. 1, are such as to require objectionably large currents from 68 to obtain satisfactory generator torque currents in windings 11 and 34, then the switch 70 is moved to the left, thus disconnecting the battery 68 from the winding 50 and connecting the battery to the coils 66 and 67 having suitable resistance and number of turns. Direct current flows in the coils 66 and 67, the directions of these currents and the magnetic polarities they produce being for example represented by the arrows and the light letters N and S adjacent to the coils 66 and 67 respectively. The coils 66 and 67 produce direct current N and S poles extending over smaller arcs than that covered by the resultant direct current N and S poles when the winding 50 was energized by direct current. If the resistance 72 is suitably adjusted the direct currents N and S poles of coils 66 and 67 will have the same effective strength as the resultant direct current N and S poles of winding 50 and therefore the results obtainable by applying direct current to windings 50 can be duplicated by applying direct current to the coils 66 and 67.

In some cases it may be desirable to produce the generator torques in the windings 11 and 34 by circulating a very low frequency alternating current through the windings 50 or through the coils 66 and 67. This may be accomplished by closing the switch 71 to the left and closing the switch 70 to the right for energizing the windings 50 from the generator 69, or closing the switch 70 to the left for energizing the coils 66 and 67 from the generator 69. Assume that the lines 12 have a frequency of 60 cycles and that the alternating current generator 69 has a frequency of three cycles. It is obvious that when the windings 11 and 34 rotate at the speed corresponding to the synchronous speed of three cycles there will be no voltages generated in the windings 11 and 34 by the flux produced by the current from 69 and there will be no generator torque. When windings 11 and 34 rotate at a higher speed than that corresponding to synchronous speed of three cycles there will be voltages generated in windings 11 and 34 by the flux produced by the current from 69 and a generator torque will be produced in windings 11 and 34. If the resistances 72 and 63 to 65′ inclusive are suitably adjusted the motor 10 will have stabilized creeping speeds. If the frequency of the generator 69 is varied the speed at which the zero value of the generator torque curve T, Fig. 2, occurs will be varied, thus giving an additional flexibility to the control system. It is obvious that the principles utilized are the same as when direct current from the battery 68 was used since direct current is assumed as alternating current having zero frequency and therefore with direct current the zero generator torque occurs at zero speed.

It is obvious that in many cases sufficient generator torque may be obtained by having local circulating currents flow in only one of the windings 11 and 34 and then the other winding may be connected so as to perform its usual motor functions without providing paths for the flow of local circulating currents.

In Fig. 1 the closing of switches 70 and 71 to the right sends direct current through the winding 50 but alternating current does not flow through the battery 68 because there is no alternating E. M. F. between the points 73 and 74. To assist the explanation of why there is no alternating E. M. F. between points 73 and 74 I have represented in Fig. 3 a simplified drawing of the connections between the commutated winding, secondary windings and direct current source or low frequency alternating current generator when my invention is applied to a three-phase, two-pole Schrage motor. In Fig. 3 the primary windings of the motor have been omitted to simplify the drawing and similar parts to those in Fig. 1 are represented by the same numbers. In Fig. 3 the winding 75 is connected to the commutator 76 on which rest brushes 77, 78, 79, 80, 81 and 82, spaced 60 electrical degrees apart and the instantaneous voltage at the brushes is for example represented by the polarity marks adjacent to the brushes. The secondary winding 83 has one phase group consisting of coils 84 and 85 connected in series across brushes 78 and 81, a second phase group consisting of coils 86 and 87 connected in series across brushes 79 and 82, and the third phase group consisting of coils 88 and 89 connected in series across brushes 77 and 80. The arrows 90 and 91 respectively represent the instantaneous direction of the voltages generated in the winding 75 and existing between the pair of brushes 77 and 80 and the pair of brushes 78 and 81 respectively. As each pair of brushes is 180 electrical degrees apart therefore 92 represents the centers of arrows 90 and 91. The coils 84 and 85 have substantially the same resistance and reactance and 93 represents a point midway between these coils. The coils 88 and 89 have substantially the same resistance and reactance and 94 represents a point midway between these coils. Irrespective of the instantaneous value of the voltage represented by the arrow 91, this voltage is consumed by the coils 84 and 85 and as each coil consumes half of this voltage therefore points 92 and 93 are at the same potential. The same reasoning applies to the arrow 90 and the coils 88 and 89 and therefore the points 92 and 94 are at the same potential. It follows that there will be no alternating E. M. F. between points 93 and 94 and alternating current will not flow through the battery 68. It is also obvious that when the switch 71 is closed to the left the normal currents of the secondary winding 83 will not flow through the generator 69. In Fig. 1, one phase of the winding 50 that is traversed by current from 68 or 69 is connected to the brushes 38 and 47 which are separated 180 electrical degrees, and as equal values of resistances 64 and 64′ are used the voltage drop from point 73 to the brush 38 will equal the voltage drop from point 73 to the brush 47. The other phase of the winding 50 that is traversed by current from 68 or 69 is connected to the brushes 39 and 42 which are separated 180 electrical degrees, and as equal values of resistances 65 and 65′ are used the voltage drop from point 74 to the brush 39 will equal the voltage drop from point 74 to the brush 42. The points 73 and 74 thus correspond to the points 93 and 94 in Fig. 3. There will be no alternating E. M. F. due to the secondary windings 50 (Fig. 1) between points 73 and 74 and the normal currents of the secondary winding 50 will not flow through the battery 68 or the generator 69. It is obvious that irrespective of the number of motor poles there will be no alternating E. M. F. due to the secondary windings 50 between the points 73 and 74 providing the commutator brushes are separated 180 electrical degrees. This limitation does not interfere with the satisfactory operation of the motor since for reasons of efficiency it is desirable to operate the motor at creeping speeds with the commutator brushes adjusted to their minimum speed position which corresponds to the commutator brushes connected to each phase being separated 180 electrical degrees.

In Fig. 1 the coils 66 and 67 have the same number of turns, they are reversely connected and are inductively related to substantially equal portions of the normal magnetic flux from two of the normal poles having similar polarity. The voltages induced in the coils 66 and 67 by the normal magnetic flux of the motor will be substantially equal and opposite and it follows that when these coils are energized by 68 they will not circulate alternating current through 68, and when these coils are energized by 69 they will not circulate any additional alternating currents through 69.

Figure 4:
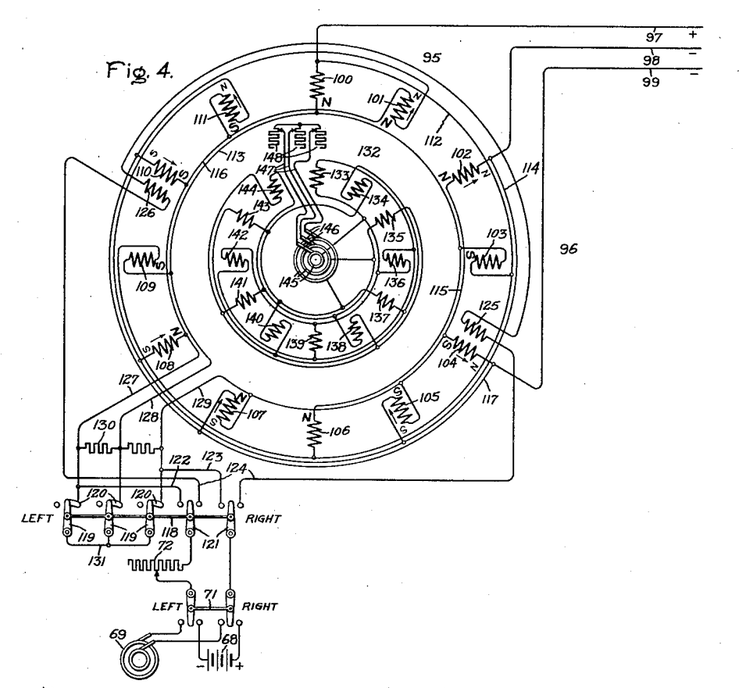

Fig. 4 represents a preferred embodiment of my invention applied to an induction motor. In Fig. 4 similar parts to those in Fig. 1 are represented by the same numbers. In Fig. 4, 95 represents a three-phase, four-pole induction motor having a stationary primary winding 96 connected to the three-phase alternating current lines 97, 98 and 99. The winding 96 consists of the coils 100 to 111 inclusive. The line 97 is connected to the lead 112 which is connected to one end of the coils 100, 103, 106, and 109 so as to form alternate magnetic poles, the other ends of these coils being connected to the lead 113. The line 98 is connected to the lead 114 which is connected to one end of the coils 102, 105, 108 and 111 to form alternate magnetic poles, the other end of the coils 102 and 105 being connected to the lead 115 and the other end of the coils 108 and 111 being connected to the lead 116. The line 99 is connected to the lead 117 which is connected to one end of the coils 104, 107, 110, and 101 to form alternate magnetic poles, the other ends of the coils 104 and 107 being connected to the lead 115 and the other end of the coils 110 and 101 being connected to the lead 116. A five-pole switch 118 has three movable blades 119 adapted to slide on the contacts 120, these blades engaging the contacts 120 when the switch is in the position shown and when the switch is moved to the right. When the switch 118 is moved to the left the blades 119 are disengaged from the contacts 120. The switch 118 also has two movable blades 121 which are connected to the leads 122 and 123 when the switch is closed to the left and when the switch is closed to the right the blades 121 are connected to the leads 124 which are connected to the two additional exciting coils 125 and 126 placed on the stationary member of the motor 95, these coils being connected to form opposite magnetic poles when current flows through them. The contacts 120 are connected to the leads 127, 128, and 129 these being connected to the leads 116, 113 and 115 respectively, the lead 128 also being connected to the center of the resistance 130 connected to leads 127 and 129. The leads 122 and 123 are connected to the leads 127 and 129 respectively. The blades 119 are connected by the lead 131 and the blades 121 may be connected to 68 or 69 through the resistance 72 and the switch 71. The motor 95 has a rotating secondary winding 132 consisting of coils 133 to 144 inclusive, these coils being connected to form a standard three-phase, four-pole, four-circuit Y connected winding, the Y connection being completed through the collector rings 145, brushes 146, leads 147 and adjustable resistances 148. To simplify the drawings the coils of the primary and secondary windings 96 and 132 and the coils 125 and 126 are represented as concentrated windings instead of the usually distributed windings and the magnetic polarities of these coils are assumed to be their polarities adjacent to the air gap between the rotating and stationary members of the motor 95.

With the switch 118 in the position shown, the winding 96 is connected equivalent to a standard three-phase, four-pole, four-circuit Y winding since the leads 113, 115 and 116 are short-circuited through the lead 131. Current does not flow in the resistance 130 since there is practically no voltage between the leads 127 and 129. At a given instant the magnetic polarities of the winding 96 caused by the flow of currents from the lines 97, 98 and 99 are shown for example by the heavy letters N and S adjacent to the coils 100 to 111 inclusive. The normal magnetic flux of the motor will have four resulting poles each having substantially equal portions of this flux. Each phase of the secondary winding 132 has four parallel paths, as for example the phase consisting of the parallel connected coils 133, 136, 139 and 142. The parallel paths of each secondary phase are inductively related to substantially equal portions of the normal magnetic flux and from the explanation given in connection with Fig. 1, it should be clear that the counter voltages induced in the parallel paths will be substantially equal and opposite and there will be only the normally slight flow of local currents between the parallel paths and thus substantially no generator torque in the winding 132, Fig. 4. With the resistances 148 cut out of the winding 132 the motor 95 has shunt speed characteristics and as the machines driven by the motor 95 are normally operated with the resistances 148 cut out there will be stable operation of the machines at their normal speeds. The creeping speeds of the machines can be obtained by inserting sufficient values of the resistances 148 in series with the winding 132 but this causes the motor 95 to have series characteristics, thus resulting in unstable creeping speeds. The resistances 148 provide a simple speed control means and it becomes desirable to use them for obtaining creeping speeds and at the same time cause the motor to have shunt speed characteristics at the creeping speeds, and these results are obtained as follows:

When the switch 118 is moved to the left, the blades 119 are disengaged from contacts 120, the blades 121 are connected to leads 122 and 123, and with the switch 71 closed to the right direct current from 68 flows through portions of winding 96 in two paths. Assuming the polarity of battery 68 as shown, the direct current flows from lead 123, through leads 129 and 115, then divides into two paths, one path being through coils 104 and 107 in parallel, through lead 117 and coils 110 and 101 in parallel, the other path being through coils 102 and 105 in parallel, through lead 114 and coils 108 and 111 in parallel, the currents from both paths uniting in lead 116 and flowing through lead 127 back to lead 122. The directions of the flow of direct currents through those coils are shown by the arrows adjacent to those coils and it is seen that there are four consecutive arrows pointing in one direction and four consecutive arrows pointing in the opposite direction. These two sets of arrows result in direct current poles of opposite polarity as those coils as shown for example by the light letters N and S adjacent the arrows. There are thus produced four consecutive direct current N poles which combine into one resultant N pole and there are produced four consecutive direct current S poles which combine into one resultant S pole. From the explanations given in connection with Figs. 1 and 2 it should be clear that a generator torque will be produced in the winding 132, Fig. 4, and if the resistances 72 and 148 are suitably adjusted the motor 95 will have the effective speed torque curve P, Fig. 2, thus resulting in stabilized creeping speeds. The movement of switch 118 to the left reconnects the winding 96 so that direct current may be sent through portions of the winding and at the same time have the winding connected substantially the same as a standard three-phase, four-pole, four-circuit Y winding. Thus, assuming that at the instant shown the polarity of line 97 is + and lines 98 and 99 is —, the current will flow from line 97, through lead 112, coils 100, 103, 106 and 109 in parallel, leads 113 and 128, to the center of resistance 130 and there divide into two paths, one path being through one-half of resistance 130, leads 127 and 116, coils 108 and 111 in parallel, to lead 114 and line 98 and coils 110 and 101 in parallel to lead 117 and line 99, and the other path being through the other half of the resistance 130, leads 129 and 115, coils 105 and 102 in parallel to lead 114 and line 98 and coils 107 and 104 in parallel to lead 117 and line 99. The impedance of the coils are substantially equal and the current from the coils connected to line 97 divides equally among the coils connected to lines 98 and 99. The resistance 130 thus serves to connect the lines 127, 128 and 129 into a Y connection for the winding 96 and at the same time maintain balanced phase currents. The impedance offered by 130 to the flow of alternating current from the lines 97, 98 and 99 is negligible and only a small direct current will flow in resistance 130 because the voltage of the battery 68 is comparatively low and this voltage is further reduced by the resistance 72. Alternating current will not flow through the battery 68 because the leads 127 and 129 are a part of the Y connection and there is practically no alternating E. M. F. between these leads.

If the switches 71 and 118 are closed to the left the generator 69 will circulate low frequency alternating current through those coils which have been previously described as traversed by direct current from 68. From the explanation given in connection with Fig. 1 it should be clear that the flux produced in those coils by the current from 69 will produce a generator torque in winding 132, Fig. 4, and if the resistances 72 and 148 are suitably adjusted the motor will have stabilized creeping speeds and if the frequency of the generator 69 is varied, an additional flexibility to the control system will be obtained. It is obvious that alternating current from the lines 97, 98 and 99 will not circulate through the generator 69.

If the switch 118 is closed to the right the lead 131 will connect the winding 96 as a standard Y connected winding and if the switch 71 is closed to the right, direct current from the battery 68 will flow through the coils 125 and 126 and if the switch 71 is closed to the left, low frequency alternating current from the generator 69 will flow through the coils 125 and 126. From the explanation given in connection with Fig. 1, it should be clear that in either case a generator torque will be produced in the winding 132, Fig. 4, and if the resistances 72 and 148 are suitably adjusted the motor 95 will have stabilized creeping speeds. It is obvious that alternating current from the lines 97, 98 and 99 will not circulate through 68 or 69.

Figure 5:
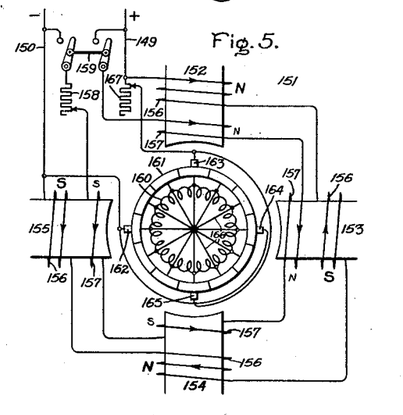
Fig. 5 represents a preferred embodiment of my invention as applied to a direct current shunt motor and in this figure I represent a motor having two sets of field windings excited by direct current, one set producing the motor torque and the other set producing the generator torque in the revolving armature.

Fig. 5 represents a preferred embodiment of my invention as applied to a four-pole, direct current shunt motor. In this figure the direct current source is represented by the lines 149 and 150 having the assumed polarity as shown. The shunt motor represented by 151 has four stationary pole pieces 152, 153, 154 and 155 on each of which is placed a coil 156 and a coil 157. The coils 156 are connected in series and directly to the lines 149 and 150, the direction of current flow in these coils and the polarities produced being shown for example by the arrows on the coils and the heavy letters N and S adjacent to the coils. The coils 157 are connected in series and may be connected to the lines 149 and 150 through the adjustable resistance 158 and the switch 159, and when the switch 159 is closed the current flow in these coils and the polarities produced will be as shown for example by the arrows on the coils and the light letters N and S adjacent to the coils. The motor 151 has a four-pole rotating commutated winding 160 of the usual direct current multiple circuit drum wound type, this winding being connected to the commutator 161 on which rest brushes 162 to 165 inclusive and it is assumed that the brushes are in their correct operating position. Each of the equalizing leads represented by 166 is connected to diametrically opposite points in the winding 160. The brushes 162 and 164 are connected directly to the line 150 and the brushes 163 and 165 are connected to the line 149 through the adjustable resistance 167.

During normal operation the switch 159 is open and the motor 151 has its normal magnetic flux with four poles, each having substantially equal portions of this flux. The current from the lines 149 and 150 flows through the winding 160 in four parallel paths, each of these paths being inductively related to substantially equal portions of the normal magnetic flux and there will be only the normally slight flow of local currents between these paths and thus substantially no generator torque in the winding 160. If the resistance 167 is cut out, the motor 151 will operate at its normal speeds with shunt speed characteristics and there will be stable operation of the machines driven by the motor 151. The creeping speeds of the motor can be obtained by inserting a sufficient value of the resistance 167 in series with the armature winding 160 but this causes the motor to have series characteristics and results in unstable creeping speeds. If the switch 159 is closed the direction of the current flowing in the coils 157 as shown by the arrows on the coils produces two adjacent N poles and two adjacent S poles as shown by the light letters N and S adjacent to those coils. The two adjacent N poles produced by coils 157 combine into one resultant N pole and the two adjacent S poles produced by coils 157 combine into a resultant S pole. From the explanation given in connection with Fig. 1, it should be clear that a generator torque will be produced in the winding 160 and if the resistances 158 and 167, Fig. 5, are suitably adjusted the motor 151 will have stabilized creeping speeds. It is also obvious that similar results can be obtained when the winding 160 has no equalizing leads.

Figure 6:
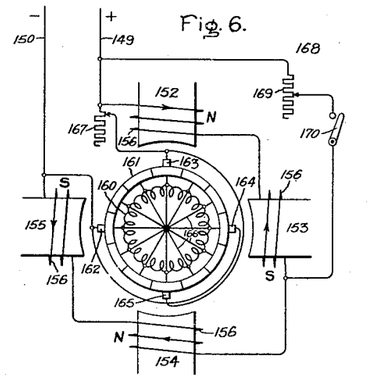
Fig. 6 represents a modification of Fig. 5 since in Fig. 6 I employ only one set of field windings to simultaneously produce the motor and generator torques in the revolving armature.

Fig. 6 represents a modification of Fig. 5, similar parts in both figures being represented by the same numbers. In Fig. 6 the motor is represented by 168 and across the coils on the poles 152 and 153 there is connected an adjustable resistance 169 in series with the switch 170. During normal operation of the motor the switch 170 is open and the motor has its normal magnetic flux with four poles as shown for example by the letters N and S and these poles have substantially equal portions of the normal flux, thus resulting in substantially no generator torque in the winding 160. If the resistance 167 is cut out the motor operates at its normal speeds with shunt characteristics and there will be stable operation of the machines driven by the motor 168. The creeping speeds of the motor can be obtained by inserting a sufficient value of the resistance 167 in series with the armature winding 160 but this causes the motor to have series characteristics and results in unstable creeping speeds. If the switch 170 is closed the current flowing through the coils on the poles 152 and 153 will be less than the current flowing through the coils on the poles 154 and 155, thus producing unequal values of flux at these poles. From the explanation given in connection with Fig. 1, it should be clear that a generator torque will be produced in the winding 160 and if the resistances 167 and 169, Fig. 6, are suitably adjusted the motor 168 will have stabilized creeping speeds.

I have described my invention in connection with certain types of electric motors but it is obvious that the purpose of this was to explain the principles of my invention and that those skilled in the art can readily apply those principles to other types of electric motors. I therefore wish it understood that all modifications within the true spirit and scope of my invention are intended to be included within the scope of the appended claims.

What I claim as new and desire to secure by Letters Patent of the United States, is:

1. In combination, a source of alternating current, a source of direct current, a multipolar alternating current commutator motor having rotatable and stationary members, a primary winding on the rotatable member energized by the source of alternating current to produce the normal magnetic flux with the normal number of poles for said motor, the said poles having substantially equal values of this flux and the said primary winding consisting of parallel paths each having substantially the same number of coils with each of said paths inductively related to substantially equal portions of the normal magnetic flux, thereby resulting in the normally slight flow of local currents between said paths, a commutated winding on the rotatable member, secondary windings on the stationary member, connecting means between the commutated and secondary windings, and connecting means between the secondary winding and the source of direct current to simultaneously produce an additional magnetic flux whose number of poles is different from the normal number of poles, thereby resulting in an abnormal flow of local currents between said paths.

2. In combination, a source of alternating current, a source of direct current, a multipolar alternating current commutator motor having rotatable and stationary members, a primary winding on the rotatable member energized by said source of alternating current to produce the normal magnetic flux with the normal number of poles for said motor, the said poles having substantially equal values of this flux, a commutated winding on the rotatable member, the said commutated winding consisting of parallel paths each having substantially the same number of coils with each of said paths inductively related to substantially equal portions of the normal magnetic flux, thereby resulting in the normally slight flow of local currents between said paths, secondary windings on the stationary member, connecting means between the commutated and secondary windings, and connecting means between the secondary winding and the source of direct current to simultaneously produce an additional magnetic flux whose number of poles is different from the normal number of poles, thereby resulting in an abnormal flow of local currents between said paths.

3. In combination, a source of alternating current, a source of direct current, a multipolar alternating current commutator motor having rotatable and stationary members, a primary winding on the rotatable member energized by the source of alternating current to produce the normal magnetic flux with the normal number of poles for said motor, the said poles having substantially equal values of this flux and the said primary winding consisting of parallel paths each having substantially the same number of coils with each of said paths inductively related to substantially equal portions of the normal magnetic flux, thereby resulting in the normally slight flow of local currents between said paths, a commutated winding on the rotatable member, the said commutated winding consisting of parallel paths each having substantially the same number of coils with each of these paths inductively related to substantially equal portions of the normal magnetic flux, thereby resulting in the normally slight flow of local currents between these paths, secondary windings on the stationary member, connecting means between the commutated and secondary windings, and connecting means between the secondary winding and the source of direct current to simultaneously produce an additional magnetic flux whose number of poles is different from the normal number of poles, thereby resulting in an abnormal flow of local currents between the paths of the primary winding and an abnormal flow of local currents between the paths of the commutated winding.

4. In combination, a source of alternating current, a source of direct current, a multipolar alternating current commutator motor having rotatable and stationary members, a primary winding on the rotatable member energized by the source of alternating current to produce the normal magnetic flux with the normal number of poles for said motor, the said poles having substantially equal values of this flux and the primary winding consisting of parallel paths each having substantially the same number of coils with each of said paths inductively related to substantially equal portions of the normal magnetic flux, thereby resulting in the normally slight flow of local currents between said paths, a commutated winding on the rotatable member, secondary windings on said stationary member, connecting means between the commutated and secondary windings, and an exciting winding on the stationary member simultaneously energized by the direct current source to produce an additional magnetic flux whose number of poles is different from the normal number of poles, thereby resulting in an abnormal flow of local currents between said paths.

5. In combination, a source of alternating current, a source of direct current, a multipolar alternating current commutator motor having rotatable and stationary members, a primary winding on the rotatable member energized by the source of alternating current to produce the normal magnetic flux with the normal number of poles for said motor, the said poles having substantially equal values of this flux, a commutated winding on the rotatable member, the said commutated winding consisting of parallel paths each having substantially the same number of coils with each of said paths inductively related to substantially equal portions of the normal magnetic flux, thereby resulting in the normally slight flow of local currents between said paths, secondary windings on the stationary member, connecting means between the commutated and secondary windings, and an exciting winding on the stationary member simultaneously energized by the source of direct current to produce an additional magnetic flux whose number of poles is different from the normal number of poles, thereby resulting in an abnormal flow of local currents between said paths.

6. In combination, a source of alternating current, a source of direct current, a multipolar alternating current commutator motor having rotatable and stationary members, a primary winding on the rotatable member energized by the source of alternating current to produce the normal magnetic flux with the normal number of poles for said motor, the said poles having substantially equal values of this flux and the said primary winding consisting of parallel paths each having substantially the same number of coils with each of said paths inductively related to substantially equal portions of the normal magnetic flux, thereby resulting in the normally slight flow of local currents between said paths, a commutated winding on the rotatable member, the said commutated winding consisting of parallel paths each having substantially the same number of coils with each of these paths inductively related to substantially equal portions of the normal magnetic flux, thereby resulting in the normally slight flow of local currents between these paths, secondary windings on the stationary member, connecting means between the commutated and secondary windings, and an exciting winding on the stationary member simultaneously energized by the direct current source to produce an additional magnetic flux whose number of poles is different from the normal number of poles, thereby resulting in an abnormal flow of local currents between the paths of the primary winding and an abnormal flow of local currents between the paths of the commutated winding.

7. In combination, a source of alternating current, a source of direct current, a multipolar induction motor having relatively rotatable primary and secondary windings, consisting of a plurality of coils, connecting means between the primary winding and the source of alternating current to produce the normal magnetic flux with the normal number of poles for said motor, the said poles having substantially equal values of this flux, connecting means between the coils of the secondary winding to provide parallel paths each having substantially the same number of coils with each of said paths inductively related to substantially equal portions of the normal magnetic flux, thereby resulting in the normally slight flow of local currents between said paths, and connecting means between the primary winding and the source of direct current to simultaneously produce an additional magnetic flux whose number of poles is different from the normal number of poles, thereby resulting in an abnormal flow of local currents between said paths.

8. In combination, a source of alternating current, a source of direct current, a multipolar induction motor having stationary and rotatable members, a primary winding on the stationary member energized by the source of alternating current to produce the normal magnetic flux with the normal number of poles for said motor, the said poles having substantially equal values of this flux, a secondary winding on the rotatable member, the said secondary winding consisting of a plurality of coils connected to provide parallel paths each having substantially the same number of coils with each of said paths inductively related to substantially equal portions of the normal magnetic flux, thereby resulting in the normally slight flow of local currents between said paths, and an exciting winding on the stationary member simultaneously energized by the direct current source to produce an additional magnetic flux whose number of poles is different from the normal number of poles, thereby resulting in an abnormal flow of local currents between said paths.

9. In combination, a direct current source, a multipolar direct current motor having stationary and rotatable members, a plurality of exciting coils on the stationary member energized by said source to produce the normal magnetic flux of said motor with at least four substantially equally spaced apart alternate magnetic poles having substantially equal values of this flux, a commutated lap armature winding on the rotatable member connected to said source, a resistance, means for inserting said resistance in series with said armature winding, and a plurality of additional coils on the stationary member simultaneously energized by said source to produce an additional stationary magnetic flux whose number of effective poles is different from the normal number of poles, thereby resulting in an abnormal flow of local currents between the paths of said armature winding.

10. In combination, a source of electric current, a multipolar electric motor having an exciting winding connected to said source to produce the normal magnetizing flux of said motor with at least four substantially equally spaced apart alternate magnetic poles having substantially equal values of this flux, a second winding consisting of a plurality of coils inductively related to said flux, connecting means between the coils of said second winding to form a plurality of parallel paths, each having substantially the same number of coils with each of said paths inductively related to substantially equal portions of the normal magnetizing flux and with the induced voltages of the parallel paths opposing each other, thereby causing only a normally slight flow of local currents between said paths, a resistance, means for inserting said resistance in series with said second winding, and means for superimposing on said normal magnetizing flux a stationary magnetizing flux whose number of alternate magnetic poles is different from that produced by the normal magnetizing flux, thereby resulting in an abnormal flow of local currents between said paths.

11. In combination, a source of electric current, a multipolar electric motor having two exciting windings, a third winding consisting of a plurality of coils inductively related to the flux from both of said exciting windings, means for connecting one of said exciting windings to said source to produce the normal magnetizing flux of said motor with at least four substantially equally spaced apart alternate magnetic poles having substantially equal values of this flux, connecting means between the coils of said third winding to form a plurality of parallel paths each having substantially the same number of coils with each of said paths inductively related to substantially equal portions of the normal magnetizing flux and with the induced voltages of the parallel paths opposing each other, thereby causing only a normally slight flow of local currents between said paths, a resistance, means for inserting said resistance in series with said third winding, a source of direct current, and means for connecting the other exciting winding to said direct current source to produce a stationary magnetizing flux whose number of alternate magnetic poles is different from that produced by the normal magnetizing flux, thereby resulting in an abnormal flow of local currents between said paths.

12. In combination, a source of alternating current, a multipolar alternating current motor having relatively rotatable primary and secondary windings, means for connecting said primary winding to said source to produce the normal magnetizing flux of said motor with at least four alternate magnetic poles having substantially equal values of this flux, a resistance, means for inserting said resistance in series with said secondary winding, means for connecting one of said windings to form a plurality of parallel paths each having substantially the same number of coils with each of said paths inductively related to substantially equal portions of the normal magnetizing flux and with the induced voltages of the parallel paths in opposition to each other, thereby causing only a normally slight flow of local currents between said paths, a direct current source, and means for connecting the other of said windings to said direct current source to produce a stationary magnetizing flux whose number of alternate magnetic poles is different from that produced by the normal magnetizing flux, thereby resulting in an abnormal flow of local currents between said paths.

13. In combination, a source of alternating current, a multipolar alternating current motor having relatively rotatable primary and secondary windings, means for connecting said primary winding to said source to produce the normal magnetizing flux of said motor with at least four alternate magnetic poles having substantially equal values of this flux, a resistance, means for inserting said resistance in series with said secondary winding, means for connecting one of said windings to form a plurality of parallel paths each having substantially the same number of coils with each of said paths inductively related to substantially equal portions of the normal magnetizing flux and with the induced voltages of the parallel paths in opposition to each other, thereby causing only a normally slight flow of local currents between said paths, a second source of alternating current having a frequency lower than that of the first mentioned source, and means for connecting the other of said windings to said second source of alternating current to produce a stationary magnetizing flux whose number of alternate magnetic poles is different from that produced by the normal magnetizing flux, thereby resulting in an abnormal flow of local currents between said paths.

14. In combination, a source of alternating current, a multipolar alternating current motor having relatively rotatable members, a primary winding on one of said members, a secondary winding on the other of said members, means for connecting said primary winding to said source to produce the normal magnetizing flux of said motor with at least four alternate magnetic poles having substantially equal values of this flux, a resistance, means for inserting said resistance in series with said secondary winding, means for connecting the winding on one of said members to form a plurality of parallel paths each having substantially the same number of coils with each of said paths inductively related to substantially equal portions of the normal magnetizing flux and with the induced voltages of the parallel paths in opposition to each other, thereby causing only a normally slight flow of local currents between said paths, a second source of current having a frequency lower than that of the first mentioned source, and an exciting winding on the other of said members connected to said second source to produce a stationary magnetizing flux whose number of alternate magnetic poles is different from that produced by the normal magnetizing flux, thereby resulting in an abnormal flow of local currents between said paths.

15. The method of obtaining a stable creeping speed from a shunt characteristics electric motor having a lap wound commutated armature winding and a least four normal alternate magnetic poles having substantially equal values of the normal magnetizing flux, said method including the steps of increasing the resistance of the armature winding circuit and superimposing on the normal magnetizing flux of the motor a stationary magnetizing flux whose number of alternate magnetic poles is different from those produced by the normal magnetizing flux.

16. The method of obtaining a stable creeping speed from an induction motor with at least four normal alternate magnetic poles having substantially equal values of the normal magnetizing flux and a wound secondary having a plurality of parallel paths each inductively related to substantially equal portions of the normal magnetizing flux, said method including the steps of increasing the resistance of the secondary winding circuit and superimposing on the normal magnetizing flux of the motor a stationary magnetizing flux whose number of alternate magnetic poles is different from those produced by the normal magnetizing flux.

17. The method of obtaining a stable creeping speed from a shunt characteristics alternating current motor having a rotatable member provided with a primary winding and a commutated winding, with at least one of these windings connected to form a plurality of paths each having substantially the same number of coils with each path inductively related to substantially equal portions of the normal magnetizing flux of the motor and a stationary member having a secondary winding connected to the commutated winding, said method including the steps of energizing the primary winding to produce the normal magnetizing flux of the motor with at least four alternate magnetic poles having substantially equal values of this flux, increasing the resistance of the secondary winding circuit, and producing in the stationary member a stationary magnetizing flux whose number of alternate magnetic poles is different from those produced by the normal magnetizing flux.

In witness whereof, I have hereunto set my hand this 27th day of August, 1930.

JOHN I. HULL.

CERTIFICATE OF CORRECTION.

Patent No. 1,854,991.  Granted April 19, 1932, to

JOHN I. HULL.

It is hereby certified that error appears in the printed specification of the above numbered patent requiring correction as follows: Page 5, line 6, for "is" first occurrence read it; page 11, line 18, claim 7, before the word "consisting" insert the words each of said windings; page 12, line 104, claim 15, for the article "a" read at; and that the said Letters Patent should be read with these corrections therein that the same may conform to the record of the case in the Patent Office.

Signed and sealed this 7th day of June, A. D. 1932.

M. J. Moore,
Acting Commissioner of Patents.

(Seal)